United States Patent [19]

Baier et al.

[11] Patent Number: 4,583,123
[45] Date of Patent: Apr. 15, 1986

[54] CIRCUIT FOR A CONTROL DEVICE FOR FOCUSSING A LENS SYSTEM

[75] Inventors: Heinz Baier, Sindelfingen; Michael Kallmeyer, Boeblingen; Peter Koepp, Weil im Schoenbuch; Erwin Pfeffer, Holzgerlingen; Martin Schneiderhan, Stuttgart, all of Fed. Rep. of Germany

[73] Assignee: International Business Machines Corporation, Armonk, N.Y.

[21] Appl. No.: 704,360

[22] Filed: Feb. 22, 1985

[30] Foreign Application Priority Data

Feb. 22, 1984 [EP] European Pat. Off. ........ 84101835.1

[51] Int. Cl.⁴ ............................................. H04N 3/26
[52] U.S. Cl. .................................... 358/227; 354/400; 354/421; 352/140
[58] Field of Search ............... 358/227, 209, 228, 169; 352/140; 354/400, 402, 403, 406, 407, 408, 421, 293

[56] References Cited

U.S. PATENT DOCUMENTS

| | | | |
|---|---|---|---|
| 4,298,259 | 11/1981 | Aoki et al. | 354/402 |
| 4,345,825 | 8/1982 | Matteson et al. | 354/421 |
| 4,382,665 | 5/1983 | Eguchi et al. | 352/140 |
| 4,383,274 | 5/1983 | Inuiya | 358/227 |

Primary Examiner—Gene Z. Rubinson
Assistant Examiner—Robert G. Lev
Attorney, Agent, or Firm—Ronald L. Drumheller

[57] ABSTRACT

In this circuit, video signals with a continuously increasing or decreasing amplitude are applied to the signal input of a threshold difference comparator at whose reference inputs selectively determined high and low threshold signals are applied. The output of the threshold difference comparator is applied at the first input of a threshold AND gate having a second input connected to a clock. The output of the threshold AND gate supplies a clock pulse sequence which has a duration corresponding with the time during which the input video signal has an amplitude which continuously increases or decreases from one of the threshold reference amplitudes to the other. The clock pulse sequences contained in successive measuring intervals have their respective pulses counted by a counter, and are stored in a buffer. A measurement series is performed corresponding to different focus settings, optimum focus adjustment being achieved when a minimum count of clock pulses in a clock pulse sequence is obtained.

9 Claims, 7 Drawing Figures

CIRCUIT FOR A CONTROL DEVICE FOR FOCUSSING A LENS SYSTEM

DESCRIPTION

1. Technical Field

This invention relates automatic focussing apparatus and methods and more particularly to a circuit for a control device for focussing a lens system.

2. Background Art

An automatic distance focussing device and circuit is described in the journal "Funkschau", Vol. 2, 1983, at pp. 44-45. Automatic focussing is effected by triangulation using two beam paths emanating from an object at an angle relative to each other, the first beam path transferring the reference image and the second the image to be compared. Through two rigid mirrors the beam paths are deflected to the silver-coated surfaces of one single prism arranged between the beam paths to be subsequently reflected from the prism surfaces to a reference region and a comparator region of a CCD line in the image plane. The two points of impingement of the light beams associated to the beam paths are more or less separated from each other in the linear CCD array, depending on the angle between the two beam paths emanating from the object, which can then be considered a measure for the respective adjustment of the objective. From the number of clock pulses between the two points of impingement on the linear CCD array the manipulated variable is obtained which is used for positioning the objective to the exact distance with a small positioning motor. A gear transfers the shaft rotation of the positioning motor to the shiftable part of the objective which corresponds to the objective ring otherwise used for focussing.

Another kind of circuit arrangement is described in GE-OS No. 32 22 663, where a semiconductor image sensor in the image plane consists of two regions separated from each other, each comprising the same number of image elements. A signal generating assembly is arranged in series with these two semiconductor regions of the image sensor. An integration output signal is derived from the sum of all voltage differences of two respective adjacent image elements of the respective image region.

If there is no focussing, the integration output signals of the two signal generating assemblies show a difference, which is determined by means of a differential amplifier with respect to a reference voltage applied thereto. By means of the voltage discriminator at the output of the differential amplifier it is determined whether or not the signal voltage applied is between two comparator voltages. Depending on the result of such measuring, the objective is adjusted relative to optimum focussing.

Whereas the above described art relates to the optimum focussing of an optical lens system, GE-OS No. 31 31 749, which corresponds to U.S. Pat. No. 4 325 082, discloses a circuit arrangement wherein the optimum focussing state of a charge carrier beam is measured by means of digital processes. In an initial preparatory step, an electron beam is guided over a black/white checkered test pattern to produce digital signals in response to sharp signal transitions caused by the transition between black/white and white/black marks in the test raster. A differentiating circuit derives the maximum value of the respective steepness of the transition slopes of the analog signals which result from the electron beam scanning of such marks. The differential quotients for this black/white and white/black marks depend in this case of electron beam scanning on the slops steepness of the resulting analog signals, the steepness in turn depending on the spot size of the electron beam on the test pattern. The spot size is thus a measure of the focussing state of the electron-optical focussing lens system influencing the electron beam.

In the measuring process, a test raster comprising a number or black/white or white/black marks is completely scanned with the electron beam in several different measuring intervals under respectively differing focussing adjustments. For each measuring interval, a corresponding analog signal is obtained which is scanned at respective predetermined clock times, and digitalized in accordance with the actual values thus obtained. The difference in the digital values obtained for adjacent clock times is buffered in accordance with sign and value, which is proportional to the slope steepness, and thus depends on the focussing adjustment. Subsequently, the resulting maximum difference is determined by comparison, and stored.

The maximum differences obtained with respect to several measured intervals are then in turn compared with each other to find the absolutely highest difference for determining the optimum focussing. The clock time of the scanning pulses applied for the scanning of the analog signal is thus important for finding the differential quotient of the analog image signal by means of the differentiators which are used here and which consist of the corresponding differentiating elements. Such a circuit arrangement is highly complex, for example in operation, so that production and use of a correspondingly equipped automatic focussing adjustment system must be simplified to a considerable extent. The present invention is thus directed at the need for automatic focussing adjustment of optical and electron-optical lens systems.

With any of the above prior art systems, either additional optical components are needed to make the necessary adjustments, or circuit elements and functional units are required in large numbers and in complicated circuit arrangements to achieve optimum focussing of the respective lens system.

SUMMARY OF THE INVENTION

It is a primary object of this invention to avoid these drawbacks.

This is achieved by providing a circuit for a control device to focus a lens system in that the slope steepness of video signals is determined merely by counting clock pulses during the time intervals corresponding with the slope. It is assumed that slopes with a low rate of change result in a high clock count result, whereas steep slopes result in a low clock count result. The minimum count value is used as a focussing criterion for optimum focussing and is found automatically by comparing the counts obtained in individual successive measuring intervals.

The invention has the advantages that the relatively uncomplicated circuit design does not require any adjustment, that the input video signals can be in either analog or digital form, and that the system can be used for focussing both optical and electron-optical lens systems.

The circuitry is relatively uncomplicated and quickly accomplishes focus setting. The circuit itself can be realized in the form of a monolithically integrated semiconductor circuit with minimal area requirements. When this circuit is used for focussing an optical lens system, such area requirements are practically negligible compared with the area needed for the hitherto necessary mechanical elements for focus adjustment.

DESCRIPTION OF THE PREFERRED EMBODIMENTS

Figure 1:
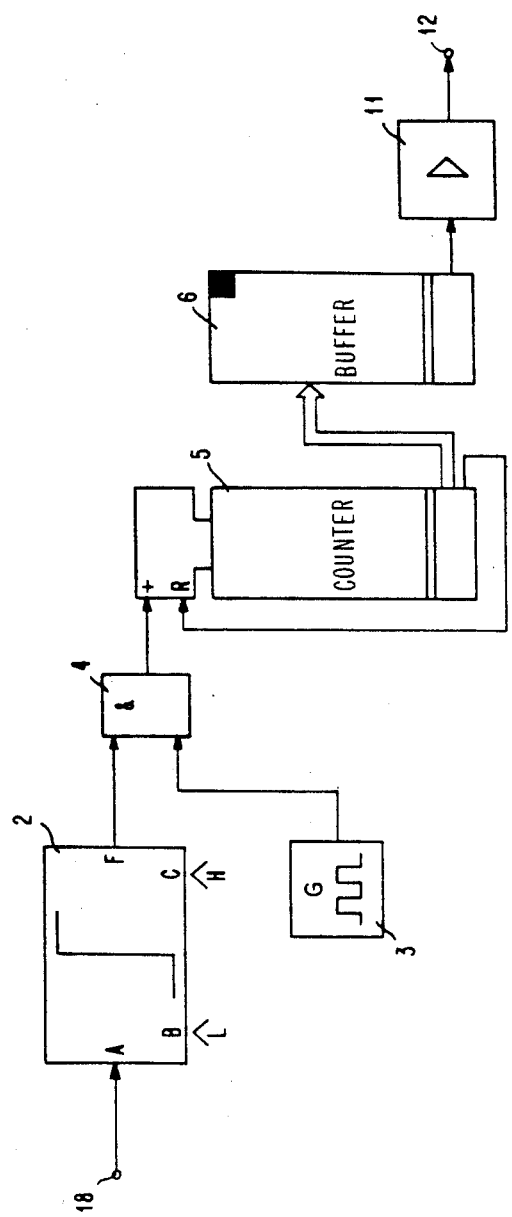
FIG. 1 is a general block diagram of a circuit in accordance with the present invention.

The principle of this invention will be described now by reference to the general block diagram of FIG. 1. Input video signals are applied through an input terminal 18 to an input A of a threshold difference comparator 2. The input video signals may be in any form, i.e. either in the form of analog or digital signals and in either parallel or serial mode. The video signals to be processed in accordance with this invention are based upon the abrupt contrast differences caused by static black/white transitions in the object plane. As thresholds for the threshold comparator 2, low threshold and high threshold signals L and H are applied to the threshold comparator 2 via inputs B and C. Again, it is not important whether the threshold signals are in analog or digital form. The low threshold value L and the high threshold value H are at any rate selected in such a manner that a predetermined grey range in the gray scale is to be used for focussing the image. By shifting these thresholds, either in the direction of darker or lighter grey shades, a predetermined grey range may be focussed more easily than others, which is particularly useful when the depth of focus of an objective lens is not sufficient for sharply focussing in the image plane all surface structures of an object plane. Output F of threshold difference comparator 2 is connected to a first input of a limiter AND gate 4. The second input of AND gate 4 is connected to the output of a clock 3. The output of limiter AND gate 4 is connected to the counting input of a counter 5. A control output of counter 5 can be connected with its reset input R, and the counting output of counter 5 is connected to the data input of a buffer 6. Counting data may be transferred to buffer 6 either in parallel or serial mode. The resetting of counter 5 into the counter start position via the reset input of counter 5 can of course also be controlled externally after the termination of each counting process and the transfer of the count to buffer 6. Buffer 6 supplies output signals to terminal 12 via a driver 11. These output signals are further used in a conventional manner for focussing an associated objective.

Figure 2:
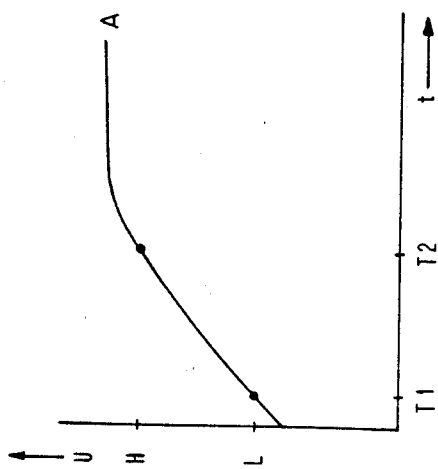
FIG. 2 is a graphical representation of an analog video signal with a low slope steepness.

The use of such a circuit for focussing simplifies optimization of edge steepnesses in the video signal caused by corresponding image structures. The basic operation of the invention will now be described by reference to FIGS. 2 through 5 of the drawings. FIG. 2 illustrates the shape of an analog signal at input A of threshold difference comparator 2 upon reaching a dark/light transition in an image when the objective lens is not focussed. The ordinate represents an input voltage U and has a low threshold value L and a high threshold value H indicated thereon. The illustrated input video signal exceeds the low threshold value L at time T1 and reaches the high threshold value H at time T2. In the present case the video signal curve has a low steepness, so there is a relatively long time interval between times T1 and T2, which corresponds to the pulse duration of the rectangular pulse generated at output F of the threshold difference comparator 2.

Threshold difference comparator 2 is conductive between times T1 and T2 and non-conductive during the other time. Consequently, AND gate 4 is enabled via its first input only during the time interval between time T1 and time T2. During this time period, pulses from clock 3 are applied through AND gate 4 to counter 5. The clock frequency must be such that there will be a sufficient resolution with respect to the number of clock pulses transferred to counter 5 during this time period even when the video signal has a maximum steepness.

Figure 4:
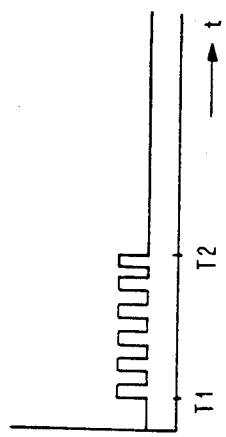
FIG. 4 is a pulse diagram illustrating a pulse sequence for a signal with a low slope steepness.

The pulse diagram of FIG. 4 illustrates a typical clock pulse sequence during interval T1 to T2 for an unfocussed lens. In this case the threshold AND gate 4 transfers a relatively high number of clock pulses (six) to counter 5.

Figure 3:
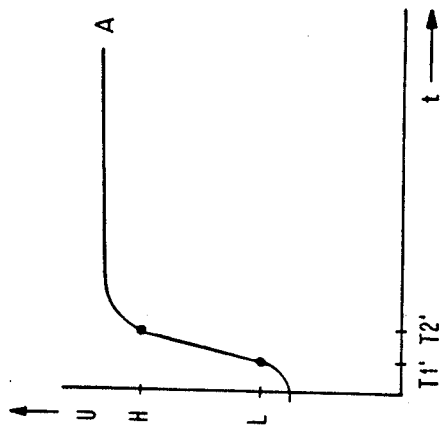
FIG. 3 is a graphical representation of an analog video signal with a high slope steepness.
Figure 5:
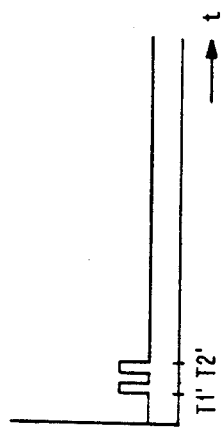
FIG. 5 is a pulse diagram illustrating a pulse sequence for a signal with a high slope steepness.

FIG. 3 shows the corresponding curve of a video signal at input A of threshold difference comparator 2 when the objective lens is sharply focussed. The same coordinate system is used in FIG. 3 as in FIG. 2. Compared with the curve in FIG. 2, however, the slope of the video signal in FIG. 3 is substantially higher, so that the time interval between times T1' and T2' is relatively short. This means that the threshold AND gate 4 is conductive (enabled) only during a relatively short period. As shown in FIG. 5, the time interval T1' to T2' defined by the low and high thresholds is sufficient in this case for transferring only two clock pulses through the threshold AND gate 4 to the counting input of counter 5.

In general the measured steepness of the signal profile may be used as an indicator for focussing. For optimum focussing of a lens, however, the contrast (dark/light) transitions must cause a maximum steepness in the shape of the video signal. Although the diagrams in FIGS. 2 to 5 suggest that the video signals are in analog form, the above described method also may be implemented in digital form by using a digital threshold difference comparator 2.

For such purpose, the high threshold H and the low threshold L would be applied in digital form and compared with the digital values of an increasing or decreasing input digital image signal. A predetermined signal would be produced at output F only when the digital value of the image signal is between the high threshold H and the low threshold L and only when the image signal is continuously increasing or decreasing in its digital values. Digital comparators suitable for this purpose per se are well known, so that no particular reference is needed, especially since the design of the comparitor is of only secondary importance.

Irrespective of whether the video signals are in digital or analog form, however, it is important that the high threshold H and low threshold L are kept constant during a focussing measurement and that the thresholds are selected in such a manner that there are individual parts of the image where the grey level and thus the video signal exceed the high threshold H and other individual parts of the image where the grey level and thus the video signal is lower than the low threshold L.

In order to focus the objective lens therefore, a clock pulse sequence or a corresponding count is transferred to a storage location in buffer 6. A buffer output signal then is generated and acts as a control signal for a suitable lens adjustment device via driver 11 and terminal 12.

The above described focussing measurement preferably is repeated at least three times at different positions in the image or video signal and each of the resulting measurements is stored in buffer 6. The optimum focussing is considered to correspond with the signal having maximum steepness and therefore with the stored measurement having the minimum count of clock pulses. It should be apparent that each time a measurement is taken and the gated clock pulses or a count thereof are transferred to and stored in buffer 6, that the counter 5 is reset again from the counter output via a signal to the reset input R of counter 5.

Individual sectors of an image may be optimally focussed by evaluating video signals only within a predetermined window corresponding with the individual sector to be optimally focussed. It is thus possible to achieve special reproducing effects selectively for specific purposes.

Figure 6:
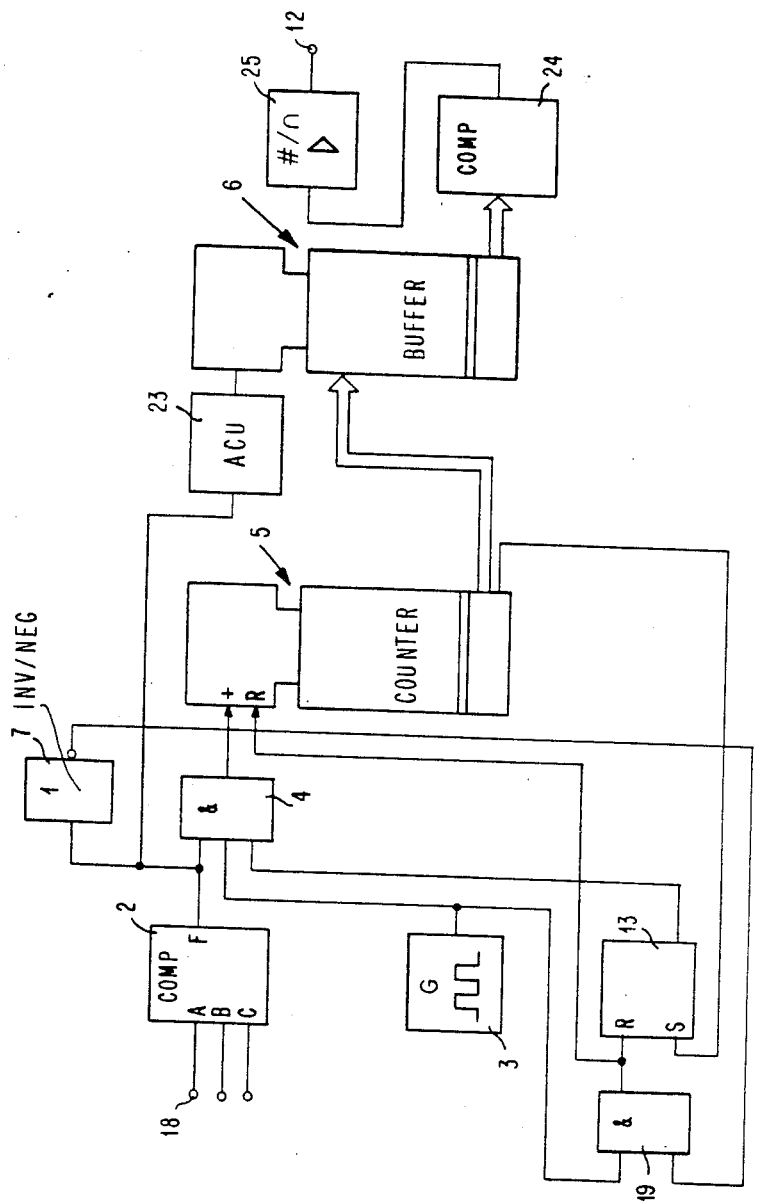
FIG. 6 illustrates a circuit in accordance with this invention which may be used to focus an electron-optical lens systems.

As suggested above, the arrangement disclosed by this invention can be used for focussing not only an optical system, but also an electron-optical system as well. The circuit shown in FIG. 6 is particularly suitable for focusing an electron-optical system, but it may be used also for stepwise focussing an optical lens system. Output F of threshold difference comparator 2 is connected not only to the first input of threshold AND gate 4 but also to an address control unit 23 of buffer 6, which is a multi-line register. Output F of threshold difference comparator 2 also is connected to the input of an invertor or negator 7. The output of negator 7 is connected to the second input of an AND gate 19 whose first input is connected to the output of clock 3. The output of AND gate 19 is connected to the reset input of a flipflop 13.

The first input of threshold AND gate 4 is again connected to output F of threshold difference comparator 2, and the second input of threshold AND gate 4 is connected to clock 3. The counting output of counter 5 is stored in buffer 6 each time at an address which is determined by the address control unit 23. An increment counter contained in address control unit 23 increments the buffer storage address by one each time a clock pulse sequence is stored. Each register stage address in buffer 6 can store a value associated with a measurement or count or focus setting.

The output of buffer 6 is applied to the input of a minimum comparator 24. The clock pulse sequences stored in buffer 6 are sent to comparator 24 in parallel to identify therefrom the clock pulse sequence with the smallest pulse length. A circuit for such a minimum comparator together with its operation is described in "IBM Technical Disclosure Bulletin", Vol. 22, No. 7, at pp. 2671-72 (December 1979). Since the present invention is not directed towards a circuit for a minimum comparator per se, no further reference is made thereto.

The output of minimum comparator 24 can e.g. be applied to a digital/analog converter 26 having a driver contained therein so that at output terminal 12 there appears setting signals which can be used directly for optimum focussing.

The circuit shown in FIG. 6 operates as follows. Each time threshold difference comparator 2 produces no pulse sequence at its output F, negator 7 and gate 19 automatically reset coupler 5 to its lowest counting stage, i.e. into the count starting position. Flipflop 13 is activated via a signal applied from the output of counter 5 to the set input of flipflop 13, which in turn enables the third input of threshold AND gate 4. Since the clock 3 continuously applies pulses to the second input of threshold AND gate 4, clock pulses are transferred as counting pulses to counter 5 as soon as there is a starting pulse from threshold difference comparator 2 at the first input of threshold AND gate 4.

Clock pulses are also applied continuously to the first input of AND gate 19, so that upon the appearance of the trailing slope of the output signal from threshold difference comparator 2, negator 7 enables AND gate 19 to release a pulse to the reset input of counter 5 as well as to the reset input of flipflop 13. The output of flipflop 13 now immediately applies a negative signal to the third input of threshold AND gate 4 so that AND gate 4 is disabled from transferring any further clock pulses to counter 5 during the resetting process.

Before counter 5 is reset, the counting result of counter 5 has already been transferred to buffer 6 in that, as described above, through the action that the threshold difference comparator output signals have on address control unit 23, the address has been incremented by the incrementing counter contained in the address control unit and clock pulse sequence has already been read into its predetermined storage position. The comparing process done by minimum comparator 24 can be executed without interruption as soon as a sufficient number of clock pulse sequences have been stored in buffer 6. However, a relatively large number of clock pulse sequences are needed for optimum focussing.

Each of the counting results stored in the register stages of buffer 6 is transferred with its associated register stage address to minimum comparator 24. If the minimum counting result is selected, the corresponding register stage address which has a specific assigned focussing value is supplied by minimum comparator 24. Alternatively, it is of course also possible for the register stage address not to be transferred to minimum comparator 24, the respective minimum counting result instead being supplied by minimum comparator 24 to be used for focus positioning criterion. Transfer of the minimum counting result itself is particularly useful for setting the focus of electron-optical lenses.

Even if the pulse released by the minimum comparator can be used for controlling a focus setting motor for an optical objective, it is still particularly advantageous for optimally focussing electron-optical lenses if the driver at the output of the minimum comparator 24 is a digital/analog converter 25. Such a digital/analog converter 25 can then supply the necessary current for an electromagnetic focussing system via output terminal 12.

Figure 7:
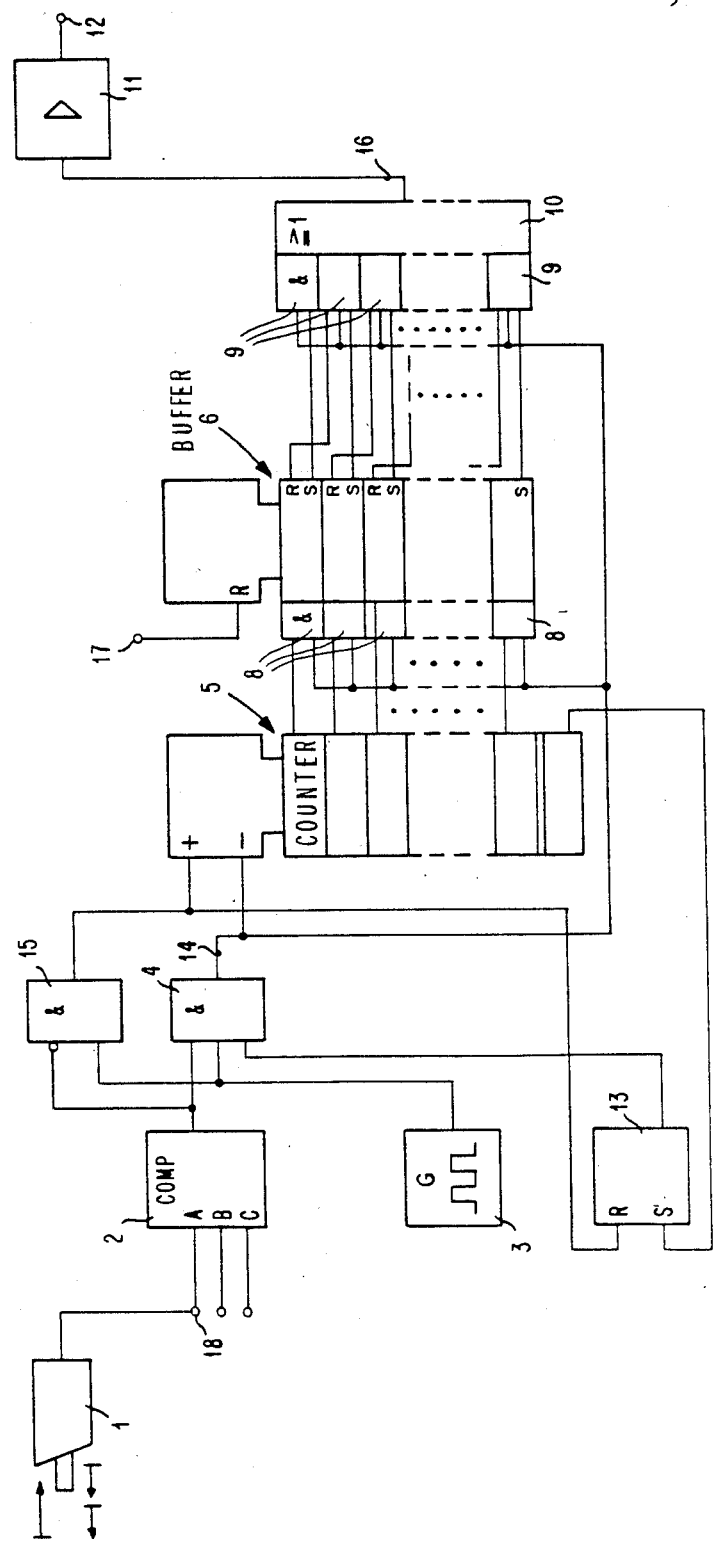
FIG. 7 illustrates another circuit in accordance with this invention which may be used to focus an optical lens system.

A circuit arrangement which is suitable for stepwise control of a motor for positioning an optical objective lens is illustrated in FIG. 7. The input circuit to counter 5 substantially corresponds to that of FIG. 6, except that there are slight modifications due to the respectively different mode of operation of counter 5.

A television camera 1 withh an ojective lens shiftable stepwise by a positioning motor (not shown here, but similar to what is shown in the above identified article of "Funkschau", Vol. 2, 1983, pp. 44-45, which is hereby incorporated by reference) supplies the video signals to an input terminal 18 of threshold difference comparator 2. The output of threshold difference comparator 2 is again supplied to the first input of threshold AND gate 4, and also to an inverting input of an AND gate 15 whose second input is the output of clock 3. The output of AND gate 15 is connected to the forward counting input of counter 5, and to the reset input of flipflop 13. While here the output of clock 3 is supplied again to the second input of threshold AND gate 4, and the output of flipflop 13 is again connected to the third input of threshold AND gate 4, the output of threshold AND gate 4 is now connected via line 14 to the reset counting input of counter 5 as well as to the first inputs of register stage AND gates 8 and output AND gates 9.

A pulse is transferred to the set input of flipflop 13 via a line from the transfer output of counter 5 when the counting stage with the highest count of counter 5 has reached its on-state. The outputs of the counting stages of counter 5 are each connected to a second input of register stage AND gates 8. Each register stage AND gate 8 is associated with a register stage of buffer 6 in such a manner that the register stage AND gates 8 supply in their on-state the contents of the respective counting stage to thus associated register stage.

The set outputs of the register stages of buffer 6 are each connected to a second input of output AND gates 9. The reset outputs of the register stages of buffer 6 which are each associated with the counting stage with the next-higher count in counter 5 are applied to the third input of output AND gates 9. The output AND gate 9 receiving the lowest count from buffer 6 contains merely two inputs, the second input being connected to the set output of the register stage storing the absolutely lowest count of the buffer 6.

The outputs of output AND gates 9 are connected to the inputs of an output OR gate 10 whose output line 16 controls the input of driver 11. The output of driver 11 controls via its output terminal 12 the stepwise rotation of a positioning motor which shifts the objective lens of television camera 1 for optimum focussing.

The circuit arrangement of FIG. 7 operates as follows. Before any focussing is done, focussing counter 5 is filled up to the maximum count by forward counting. When the maximum count of counter 5 is reached, a pulse is transferred from the transfer output of counter 5 to the set input of flipflop 13 so that the third input of threshold AND gate 4 is enabled. When the video signal applied to input A of threshold difference comparator 2 exceeds the low threshold L, threshold AND gate 4 is enabled to transfer clock pulses from clock 3 to the reset counting input of counter 5. The output pulse from threshold difference comparator 2 also simultaneously renders AND gate 15 non-conductive, so that the forward counting input to counter 5 is also deactivated. While there is a threshold difference comparator pulse, the reset counting input of counter 5 is activated to decrement the filled counter 5. Upon reaching the trailing edge of the output pulse supplied by threshold difference comparator 2, threshold AND gate 4 is rendered non-conductive and further clock pulses are not transferred to decrement counter 5. Simultaneously the second AND gate 15 will be enabled to transfer subsequent clock pulses to the incrementing input of counter 5 in order to bring the counter 5 back to its maximum count.

Since register stage AND gates 8 are enabled by the clock pulses applied during decrementing, prior to switching counter 5 from decrementing to incrementing, the set states of counter 5 are transferred to the associated register stages of buffer 6. Simultaneously and successively, the corresponding output AND gates 9 are activated by the pulses supplied by the set outputs of the non-switched counting stages of counter 5, as well as by the signals of the reset outputs of the next higher counting stage for the respective clock pulse duration so that initially for the first focussing output OR gate 10 supplies a clock pulse sequence corresponding with the pulse sequence supplied by threshold AND gate 4.

After the first focussing measurement, counter 5 is again incremented to its maximum level, with the count in buffer 6 stored during the first focussing measurement being maintained. Upon the subsequent second focussing measurement, the video signal now has a steeper slope so the duration of the output pulse of threshold difference comparator 2 is correspondingly shorter and threshold AND gate 4 obviously transfers a smaller number of clock pulses to the decrementing input of counter 5. Since a correspondingly smaller number of counter stages are thus reset during the decrementing step, consequently at least one further register stage of buffer 6 is switched into the set state, applying a corresponding output pulse to output OR gate 10. Thus, more counting stages remain in their set state so that consequently more register stages than in the first focussing measurement are switched into their set state. However, this applies only if the focussing has not been optimal in the first measuring process. During the periods between successive focussing measurements, the decrementing counting input of counter 5 remains disabled by flipflop 13 since by lowering its output level the threshold AND gate remains non-conductive also.

The above described overall process is repeated until counter 5 experiences the same or a higher clock pulse count than in the preceding count. At that point, no further register stages of buffer 6 can be switched into the storage state, since the then incremented counting stages control only register stages that have been set in the preceding focussing measurement, i.e. that are ineffective. Consequently, no further output AND gates 9 are opened so that the rate of output pulses at output terminal 12 remains constant at the amount determined by the latest clock pulse sequence entered. In this manner, the optimum focussing is maintained once it is reached.

A reset pulse at terminal 17 connected to the reset input of buffer 6 erases buffer 6 as soon as all focussing measurement processes are terminated. For focussing the objective lens of television camera 1, the objective is first brought into a maximum or minimum position from which it is stepwise adjusted to optimum focussing during the measuring processes by means of the stepping pulses transferred via output terminal 12 to the positioning motor. This has the advantage that with a video signal having an initially low slope, the stepping motor effects a high speed coarse adjustment of the objective due to the then relatively high number of clock pulses. The subsequent focussing measurement comprises a fine adjustment of the objective because the greater steepness in the rise of the video signal results in a relatively small clock pulse number.

Although, as described above, it has been assumed that the video signal amplitude has been rising, a falling amplitude of the video signal can also be used instead.

Having thus described our invention, what we claim as new, and desire to secure by Letters Patent is:

1. A circuit for a control device for focussing a lens system in response to video signals obtained in the image plane of the lens system from contrast differences due to static black/white transitions, characterized by:
    a threshold difference comparator having an input for a video signal, a first reference input for applying a low threshold reference amplitude signal, a second reference input for applying a high threshold reference amplitude signal, and an output for generating a rectangular comparator pulse in response to video signals applied to said input, said rectangular comparitor pulse having a pulse duration corresponding with the time during which said input video signal has an amplitude which continuously increases or decreases from one of said threshold reference amplitudes to the other;
    a clock for producing rectangular pulses which are substantially shorter than said comparitor pulse;
    a threshold AND gate having a first input connected to the output of said threshold difference comparator, and having a second input connected to the output of said clock, said threshold AND gate producing a clock pulse sequence corresponding in duration with said rectangular comparator pulse;
    a counter for receiving a clock pulse sequence from said threshold AND gate (4); and
    a buffer connected to said counter for storing data received from said counter.

2. A circuit as defined in claim 1, characterized in that said low and high threshold reference amplitudes applied to said threshold difference comparator correspond with a predetermined grey range in the grey scale of said input video signal.

3. A circuit as defined in claim 1, characterized by a flipflop having an output applied to a third input of said threshold AND gate and being connected with its set input to a common output of said counter activated upon a reset of said counter to a start position, the reset input of said flipflop being controlled simultaneously with the count decrementing input of said counter by the output of said threshold difference comparator.

4. A circuit as defined in claim 3, characterized in that the output of said buffer is connected via a driver to an output terminal of said circuit.

5. A circuit as defined in claim 3, characterized in that the output of said threshold difference comparator is connected to the input of an address control unit comprising an incrementing counter which increments by one with each comparator pulse, the address of said buffer being designed as a multi-line register,
    that the register line address data for storing clock pulse sequences applied in successive measuring intervals are in addition adjusting data for focussing, and
    that via the buffer output, under control by a minimum comparator, a focussing signal corresponding to the register line address which contains the smallest number of clock pulses of all clock pulse sequences stored in the register lines is transferred.

6. A circuit as defined in claim 5, characterized in that the output of said minimum comparator is applied to the input of a driver, said driver being a digital/analog converter amplifier.

7. A circuit as defined in claim 4, characterized in that said counter is incremented up to the maximum count during each period between two successive measuring intervals and is decremented during each measuring interval by the output of said threshold AND gate,
    stage outputs of said counter are respectively connected to a first input of register stage AND gates whose second inputs are applied to the output of said threshold AND gate,
    the outputs of said register AND gates are respectively connected to an input of the register stages of said buffer, said buffer acting as a register,
    the set outputs of said register stages are respectively connected to a first input of a respectively associated output AND gate,
        whose respective second input is applied to the output of said threshold AND gate, and
        whose respective third input is connected, excluding that output AND gate whose first input is connected to the set input of the register stage with the absolutely lowest count of said counter, to the reset inputs of the register stages respectively receiving the next higher count,
    the outputs of the output AND gates are applied to respectively associated inputs of an output OR gate,
    the output of the output OR gate is applied to the input of the driver, and
    that the reset input of said buffer can be activated after the termination of the focus adjusting process by a reset pulse via a control terminal.

8. A circuit as defined in claim 1, characterized in that said threshold difference comparator is designed for receiving analog voltage video signals, and
    that said high and low threshold reference amplitude signals are applied to said reference inputs in the form of corresponding DC levels.

9. A circuit as defined in claim 7, characterized in that its output terminal is connected to a pulse-controlled stepping motor for stepwise modifying the focus adjustment of an optical objective lens system of a television camera until the optimum value is reached.

* * * * *